(12) United States Patent
Hu et al.

(10) Patent No.: US 10,694,909 B2
(45) Date of Patent: Jun. 30, 2020

(54) CLUTCH DEVICE FOR UPRIGHT VACUUM CLEANER AND UPRIGHT VACUUM CLEANER HAVING SAME

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 17 days.

(21) Appl. No.: 15/539,150

(22) PCT Filed: Mar. 4, 2016

(86) PCT No.: PCT/CN2016/075606
§ 371 (c)(1),
(2) Date: Jun. 23, 2017

(87) PCT Pub. No.: WO2017/096719
PCT Pub. Date: Jun. 15, 2017

(65) Prior Publication Data
US 2018/0263442 A1     Sep. 20, 2018

(30) Foreign Application Priority Data

Dec. 10, 2015   (CN) .......................... 2015 1 0917466
Dec. 10, 2015   (CN) .......................... 2015 1 0917497
(Continued)

(51) Int. Cl.
*A47L 9/04*     (2006.01)
*A47L 9/28*     (2006.01)
(Continued)

(52) U.S. Cl.
CPC ............... *A47L 9/0444* (2013.01); *A47L 5/00* (2013.01); *A47L 5/225* (2013.01); *A47L 5/28* (2013.01);
(Continued)

(58) Field of Classification Search
CPC . A47L 5/28; A47L 5/30; A47L 9/0477; A47L 5/00; A47L 5/225; A47L 5/32;
(Continued)

(56) References Cited

U.S. PATENT DOCUMENTS 1,328,737 A * 1/1920 Hoover ..................... A47L 5/34
                                                15/323
2,026,808 A * 1/1936 White ....................... A47L 5/30
                                                15/319
(Continued)

FOREIGN PATENT DOCUMENTS

CN         2321378 Y      6/1999
CN         2845692 Y     12/2006
(Continued)

*Primary Examiner* — Bryan R Muller
*Assistant Examiner* — Joel D Crandall
(74) *Attorney, Agent, or Firm* — Kilpatrick Townsend & Stockton, LLP

(57) ABSTRACT

A clutch device (400) for an upright vacuum cleaner and an upright vacuum cleaner (1) having the same are provided, in which the clutch device (400) is disposed between an electric motor assembly (200) and a machine body assembly (300) of the upright vacuum cleaner (1), and the electric motor assembly (200) includes an electric motor housing (21) and an electric motor (22). The clutch device (400) includes: a sliding track (41*d*) driven (300) to move by the machine body assembly; a toggling tongue (42*d*) fixed to the electric motor (22) and rotatable with respect to the electric motor housing (21); and a lever member (43*d*) having a second end of the lever member (43*d*) slidably fitted to the sliding track (41*d*) and a first end fitted with an end of the (Continued)

toggling tongue (42d). When the machine body assembly (300) drives the sliding track (41d) to move, the sliding track (41d) drives the lever member (43d) to rotate, and when the lever member (43d) rotates, the toggling tongue (42d) is stirred to make the electric motor (22) rotate with respect to the electric motor housing (21).

15 Claims, 5 Drawing Sheets

(30) Foreign Application Priority Data

| Dec. 10, 2015 | (CN) | 2015 1 0917498 |
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.

| A47L 9/32 | (2006.01) |
| A47L 9/12 | (2006.01) |
| A47L 5/32 | (2006.01) |
| A47L 5/34 | (2006.01) |
| A47L 5/00 | (2006.01) |
| A47L 5/22 | (2006.01) |
| A47L 9/00 | (2006.01) |
| A47L 9/02 | (2006.01) |
| A47L 9/16 | (2006.01) |
| A47L 9/22 | (2006.01) |
| A47L 5/30 | (2006.01) |
| F16H 7/08 | (2006.01) |
| A47L 9/10 | (2006.01) |
| A47L 9/14 | (2006.01) |
| A47L 5/28 | (2006.01) |
| F16D 23/12 | (2006.01) |
| A47L 9/24 | (2006.01) |

(52) U.S. Cl.
CPC .................. *A47L 5/30* (2013.01); *A47L 5/32* (2013.01); *A47L 5/34* (2013.01); *A47L 9/009* (2013.01); *A47L 9/02* (2013.01); *A47L 9/04* (2013.01); *A47L 9/0411* (2013.01); *A47L 9/0477* (2013.01); *A47L 9/102* (2013.01); *A47L 9/127* (2013.01); *A47L 9/1409* (2013.01); *A47L 9/16* (2013.01); *A47L 9/165* (2013.01); *A47L 9/1666* (2013.01); *A47L 9/1683* (2013.01); *A47L 9/22* (2013.01); *A47L 9/2857* (2013.01); *A47L 9/2863* (2013.01); *A47L 9/325* (2013.01); *F16H 7/0827* (2013.01); *A47L 5/22* (2013.01); *A47L 9/00* (2013.01); *A47L 9/248* (2013.01); *A47L 9/28* (2013.01); *A47L 9/2852* (2013.01); *F16D 2023/126* (2013.01)

(58) Field of Classification Search
CPC ... A47L 5/34; A47L 9/009; A47L 9/02; A47L 9/04; A47L 9/0411; A47L 9/102; A47L 9/127; A47L 9/1409; A47L 9/16; A47L 9/165; A47L 9/1666; A47L 9/1683; A47L 9/22; A47L 9/2857; A47L 9/2863; A47L 9/325; F16H 7/0827
USPC .......................................... 15/389, 390, 391
See application file for complete search history.

(56) References Cited

U.S. PATENT DOCUMENTS

| 2,601,698 A | * | 7/1952 | Humphrey | A47L 5/34 |
| | | | | 15/390 |
| 6,055,703 A | | 5/2000 | Redding et al. | |
| 2003/0024070 A1 | | 2/2003 | Theiss | |
| 2010/0017999 A1 | * | 1/2010 | Bassett | A47L 5/30 |
| | | | | 15/389 |

FOREIGN PATENT DOCUMENTS

| CN | 1954750 A | 5/2007 |
| CN | 202223151 U | 5/2012 |
| CN | 204133367 U | 2/2015 |

* cited by examiner

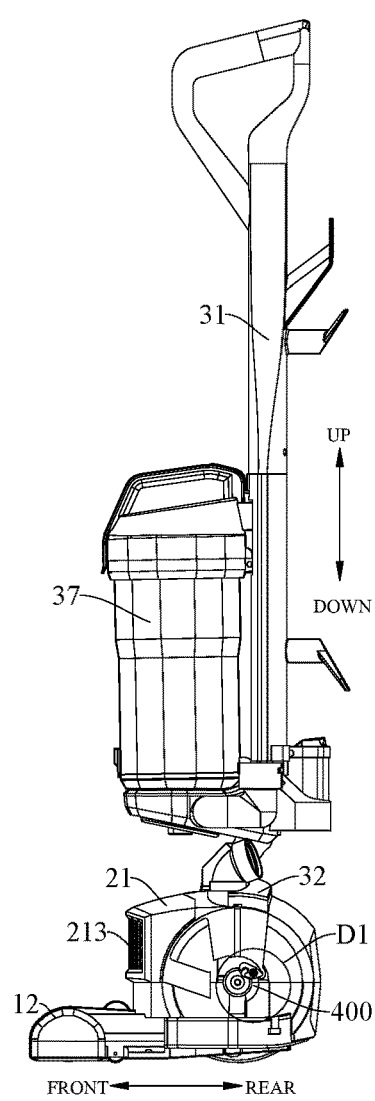
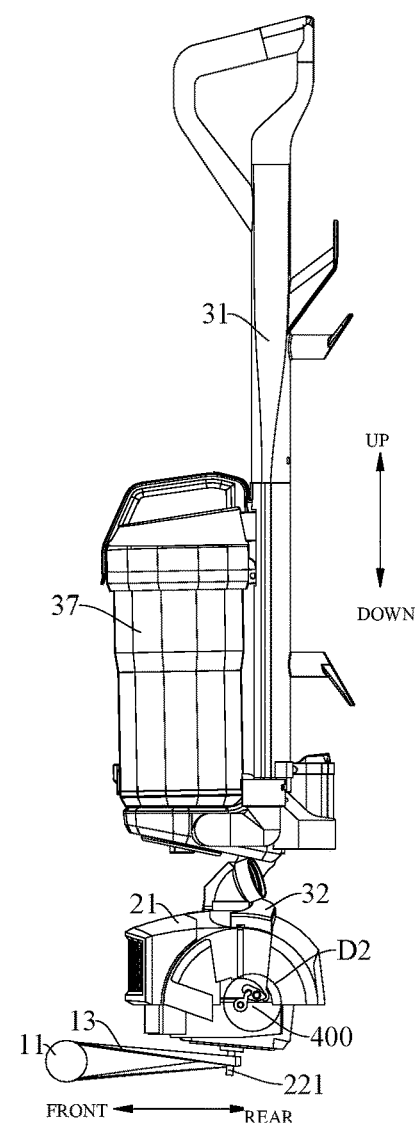
Fig. 14
Fig. 16
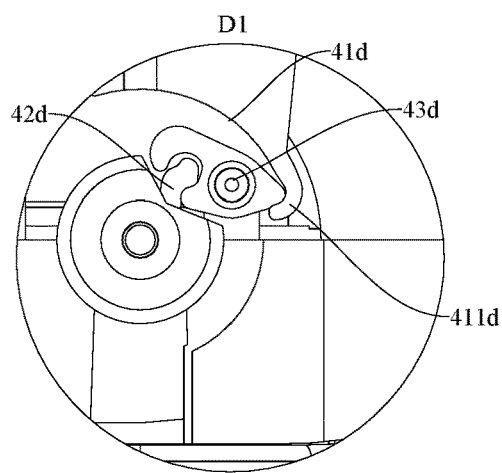
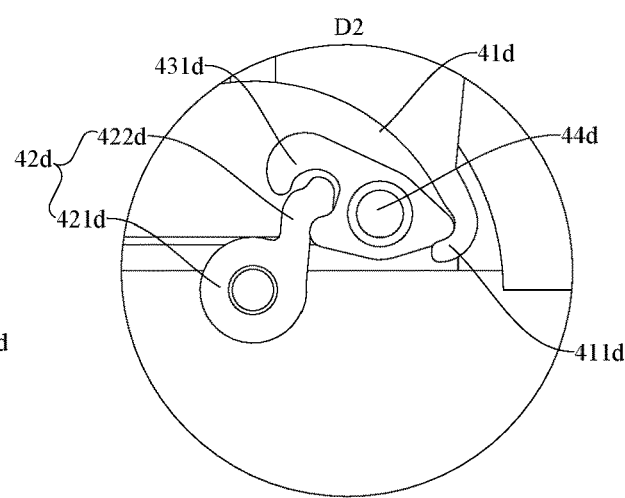
Fig. 15
Fig. 17

CLUTCH DEVICE FOR UPRIGHT VACUUM CLEANER AND UPRIGHT VACUUM CLEANER HAVING SAME

CROSS REFERENCE TO RELATED APPLICATION

The present application is a National Stage of International Application No. PCT/CN2016/075606, filed Mar. 4, 2016, which claims the priority and benefit of Chinese Patent Application Nos. 201510917499.7, 201521029002.X, 201510917466.2, 201521028726.2, 201510917497.8, 201521028730.9, 201521029087.1, 201510918662.1, 201521028812.3, 201510918544.0, 201521028739.X, 201510918580.7, 201521027156.5, 201510917498.2, 201521027158.4, 201521028814.2, 201521028779.4, 201521029798.9, 201510918541.7, 201521027550.9, 201510917653.0, 201521028784.5, 201510917528.X, 201521028913.0, and 201521030034.1, all filed on Dec. 10, 2015, and 201610114861.1 and 201620155481.8, both filed on Mar. 1, 2016, the contents of which are incorporated herein by reference in their entirety.

FIELD

The present disclosure relates to a field of cleaning machineries, and more particularly to a clutch device for an upright vacuum cleaner and an upright vacuum cleaner having the same.

BACKGROUND

A vacuum cleaner in the related art includes two electric motors so as to drive a brushroll and a fan respectively, in which the electric motor driving the fan is in general arranged horizontally, i.e. a motor shaft of the electric motor is parallel to a mounting platform of the electric motor, such that a motor housing of the electric motor has a too large volume, increasing an occupied area of the electric motor. Meanwhile, the electric motor which is arranged horizontally will bring a great limit to arrangements of other parts in the vacuum cleaner.

SUMMARY

Embodiments of the present disclosure seek to solve at least one of the problems existing in the related art to at least some extent. For that reason, a clutch device for an upright vacuum cleaner is provided by the present disclosure. The clutch device for the upright vacuum cleaner has a simple and compact structure, steady and reliable operation and a low cost, which may achieve an objective of driving the electric motor to rotate.

An upright vacuum cleaner having the clutch device is further provided by the present disclosure.

In the clutch device for the upright vacuum cleaner according to embodiments of a first aspect of the present disclosure, the clutch device is disposed between an electric motor assembly and a machine body assembly of the upright vacuum cleaner. The electric motor assembly includes an electric motor housing and an electric motor disposed in the electric motor housing. The clutch device includes: a sliding track driven to move by the machine body assembly; a toggling tongue fixed to the electric motor housing and rotatable with respect to the electric motor housing; and a lever member having a second end of the lever member slidably fitted to the sliding track and a second end fitted with an end of the toggling tongue. When the machine body assembly drives the sliding track to move, the sliding track drives the lever member to rotate, and when the lever member rotates, the toggling tongue is stirred to make the electric motor rotates with respect to the electric motor housing.

The clutch device for the upright vacuum cleaner according to embodiments of the present disclosure has a simple structure and a low cost, and is easy to manufacture and process. By providing the lever member of the clutch device rotatably to the electric motor housing, and making the two ends of the lever member fitted with the machine body assembly and the electric motor correspondingly, the objective of driving the electric motor to rotate may be implemented, thereby achieving adjustment of a tension degree of the drive belt, ensuring normal working of dust sweep and dust suction, and making the operation steady and reliable along with a high working efficiency.

According to an embodiment of the present disclosure, a lower end of the sliding track is provided with a stopping block so as to prevent the end of the lever member from slipping out of the lower end of the sliding track.

According to an embodiment of the present disclosure, the sliding track extends along a curve.

According to an embodiment of the present disclosure, the sliding track extends along an arc line of which a center axis is configured as a rotation axis of the machine body assembly.

According to an embodiment of the present disclosure, the first end of the lever member is configured as a hook, and the end of the toggling tongue is engaged in the hook.

According to an embodiment of the present disclosure, the toggling tongue includes a rotating portion, in which one of the rotating portion and the electric motor housing is provided with a rotating shaft, and the other one of the rotating portion and the electric motor housing is provided with a rotating shaft hole configured to be rotatably fitted with the rotating shaft; and a tongue portion having a first end connected to the rotating portion and a second end extending along a curve facing a direction away from the rotating portion, the second end of the tongue portion being fitted with the first end of the lever member.

According to an embodiment of the present disclosure, the toggling tongue is integrally formed with the electric motor casing of the electric motor.

According to an embodiment of the present disclosure, the lever member is rotatably connected to a side wall of the electric motor housing.

According to an embodiment of the present disclosure, two lever members are provided and are symmetrically disposed to two sides of the electric motor housing.

The upright vacuum cleaner according to a second aspect of embodiments of the present disclosure includes: a brushroll and an electric motor assembly, in which the electric motor assembly includes an electric motor housing and an electric motor disposed in the electric motor housing, and the electric motor drives the brushroll to roll by the drive belt and is rotatable between a first vertical position of tensioning the drive belt and a first inclined position of relaxing the drive belt; a machine body assembly including a machine body and a bridging member mounted to the machine body, in which the bridging member is rotatably connected to the electric motor housing so that the machine body is rotatable between a second vertical position and a second inclined position; and the clutch device according to the above embodiments, in which the clutch device is disposed between the bridging member and the electric motor, and when the machine body is moved from the second vertical position to the second inclined position, the bridging member drives the electric motor to move from the first inclined position to the first vertical position by the clutch device.

According to an embodiment of the present disclosure, an angle by which the electric motor is rotated from the first inclined position to the first vertical position ranges from 1° to 10°.

According to an embodiment of the present disclosure, an angle by which the electric motor is rotated from the first inclined position to the first vertical position ranges from 3° to 8°.

According to an embodiment of the present disclosure, the upright vacuum cleaner further includes a tensioning pulley or an elastic element for adjusting the tension degree of the drive belt.

According to an embodiment of the present disclosure, the bridging member and the machine body are separately formed and connected by assembling, or the bridging member and the machine body are integrally formed.

According to an embodiment of the present disclosure, an electric motor shaft of the electric motor is vertically disposed, a rotation axis of the brushroll is disposed perpendicularly to the electric motor shaft, and the drive belt is provided with a twist angle of 90° and is twined around the electric motor shaft and the brushroll so that the electric motor drives the brushroll to rotate.

According to an embodiment of the present disclosure, the brushroll includes a first brushroll segment provided with bristle, a second brushroll segment provided with bristle and a connecting shaft segment connected between the first brushroll segment and the second brushroll segment, and the drive belt is twined around the electric motor shaft of the electric motor and the connecting shaft segment so that the electric motor drives the brushroll to rotate.

According to an embodiment of the present disclosure, respective center axes of the first brushroll segment, the second brushroll segment and the connecting shaft segment are in the same line, and the first brushroll segment and the second brushroll segment are symmetrical relative to the drive belt.

According to an embodiment of the present disclosure, the upright vacuum cleaner also includes a brushroll casing covering the brushroll, in which the brushroll casing is internally provided with a drive belt mounting cavity for accommodating the connecting shaft segment and the drive belt, and a first air suction flow passage and a second air suction flow passage located at two sides of the mounting cavity and spaced apart from the mounting cavity.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

FIG. 14 is a lateral view of the upright vacuum cleaner shown in FIG. 1, in which a machine body is at a second vertical position;

FIG. 15 is an enlarged view of a portion denoted by D1 shown in FIG. 14;

FIG. 16 is a partial assembly view of the upright vacuum cleaner shown in FIG. 14;

FIG. 17 is an enlarged view of a portion denoted by D2 shown in FIG. 16;

Figure 1:
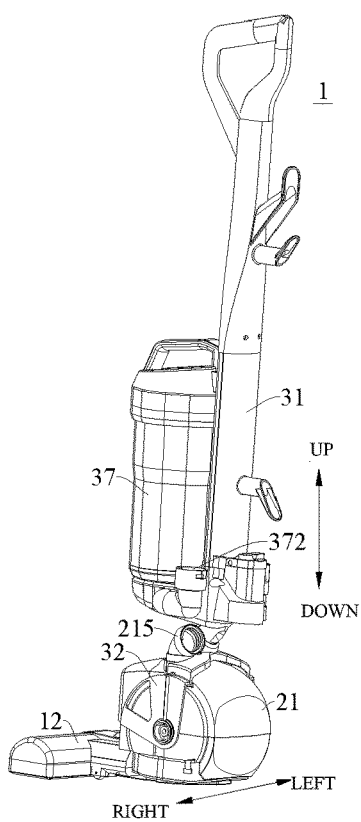
FIG. 1 is a schematic view of an upright vacuum cleaner according to an embodiment of the present disclosure.

REFERENCE NUMERALS 1 upright vacuum cleaner;
100 brushroll assembly; 11 brushroll; 111 first brushroll segment; 1111 first body; 1112 first bristle; 112 second brushroll segment; 1121 second body; 1122 second bristle; 113 connecting shaft segment; 12 brushroll casing; 122 brushroll air suction flow passage; 1221 first air suction flow passage; 1222 second air suction flow passage; 123 drive belt mounting cavity; 124 upper casing; 125 lower casing; 13 drive belt; 14 tensioning pulley;
200 electric motor assembly; 21 electric motor housing; 211 dirty air outlet; 212 clean air inlet; 213 air exhaust hole; 214 dirty air output pipe; 215 clean air input pipe; 216 electric motor air suction flow passage; 2161 first branch flow passage; 2162 second branch flow passage; 22 electric motor; 221 electric motor shaft; 222 electric motor casing;
300 machine body assembly; 31 machine body; 311 machine body air exhaust flow passage; 32 bridging member; 321 top plate; 322 lateral plate; 37 dust cup; 371 separating chamber; 372 air inlet; 373 air outlet; 38 rolling wheel; 39 air exhaust pipe;

400 clutch device; 41d sliding track; 411d stopping block; 42d toggling tongue; 421d rotating portion; 422d tongue portion; 43d lever member; 431d hook; 44d rotating shaft; 51 air inlet pipe; 52 hose.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

A clutch device 400 for an upright vacuum cleaner 1 according to embodiments of a first aspect of the present disclosure will be described in the following with reference to FIGS. 1-23.

In the clutch device 400 for the upright vacuum cleaner 1 according to embodiments of the present disclosure, the clutch device 400 is disposed between an electric motor assembly 200 and a machine body assembly 300 of the upright vacuum cleaner 1. The electric motor assembly 200 includes an electric motor housing 21 and an electric motor 22 disposed in the electric motor housing 21. FIG. 1 illustrates that the electric motor assembly 200 mainly includes the electric motor 22 and the electric motor housing 21, in which an accommodating cavity for mounting the electric motor 22 is defined in the electric motor housing 21, and the electric motor 22 is movably disposed in the accommodating cavity and is pivotal with respect to the electric motor housing 21. The electric motor 22 may drive a fan to rotate so as to generate an air flow for dust suction, thereby providing the upright vacuum cleaner 1 with a vacuuming power. The electric motor 22 may further drive a brushroll 11 to rotate around its own axis, thereby achieving an objective of cleaning the floor. Specifically, a drive belt 13 is disposed between the electric motor 22 and the brushroll 11 and is in connection with the electric motor 22 and the brushroll 11, and the electric motor 22 drives the brushroll 11 by the drive belt 13. The machine body assembly 300 includes a machine body 31 and a bridging member 32 mounted to the machine body 31, and the bridging member 32 is rotatably connected to the electric motor housing 21 so that the machine body 31 is rotatable between a vertical position and an inclined position.

Further, the clutch device 400 includes a sliding track 41d, a toggling tongue 42d and a lever member 43d. More particularly, the sliding track 41d is driven to move by the machine body assembly 300. The toggling tongue 42d is fixed to the electric motor 22 and rotatable with respect to the electric motor housing 21. A second end of the lever member 43d is slidably fitted to the sliding track 41d and a first end thereof is fitted with an end of the toggling tongue 42d. FIG. 14 illustrates that the clutch device 400 is disposed between the electric motor assembly 200 and the machine body assembly 300 and is movably connected to the electric motor assembly 200 and the machine body assembly 300. The lever member 43d of the clutch device 400 is rotatably provided to the electric motor housing 21, and the sliding track 41d of the clutch device 400 is provided to the machine body assembly 300. The toggling tongue 42d is fixedly provided to an electric motor casing 222 of the electric motor 22, the first end of the lever member 43d is fitted with the toggling tongue 42d, and the second end of the lever member 43d is fitted with the sliding track 41d.

Figure 18:
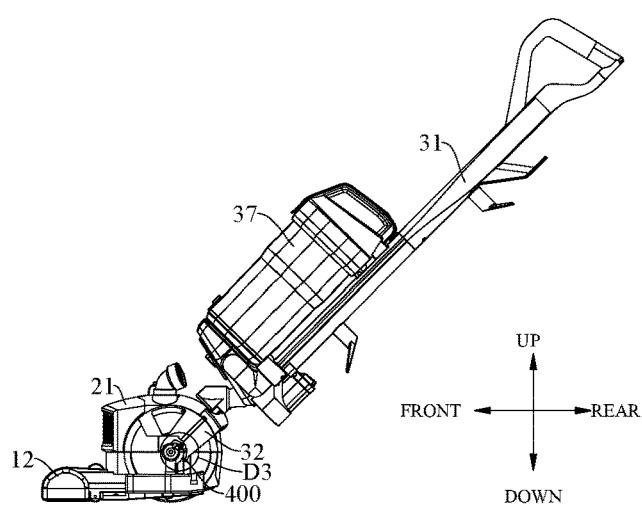
FIG. 18 is a lateral view of the upright vacuum cleaner shown in FIG. 1, in which a machine body is at a second inclined position.
Figure 19:
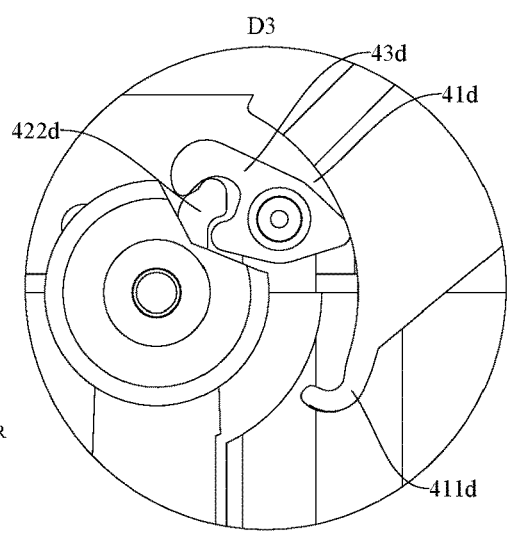
FIG. 19 is an enlarged view of a portion denoted by D3 shown in FIG. 18.
Figure 20:
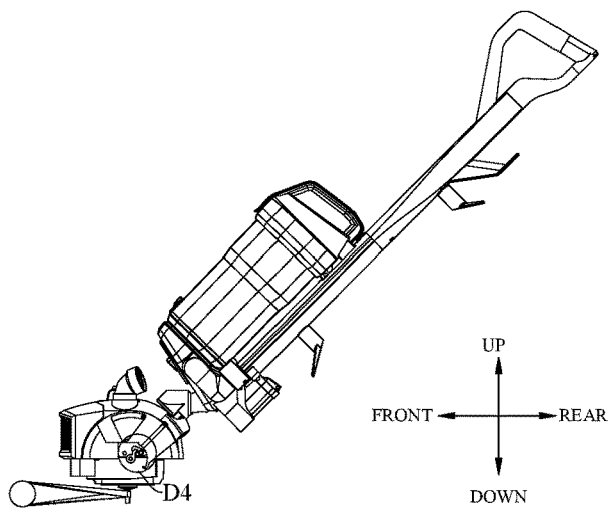
FIG. 20 is a partial assembly view of the upright vacuum cleaner shown in FIG. 18.

When the machine body assembly 300 drives the sliding track 41d to move, the sliding track 41d drives the lever member 43d to rotate, and when the lever member 43d rotates, the toggling tongue 42d is stirred to make the electric motor 22 rotates with respect to the electric motor housing 21. Specifically, when the machine body 31 is operated by hand from the vertical position to the inclined position (inclined backwards as shown in FIG. 18), the bridging member 32 on the electric motor housing 21 generates clockwise rotation with respect to the electric motor housing 21, and thus the sliding track 41d on the bridging member 32 generates clockwise rotation with respect to the lever member 43d. As the sliding track 41d is fitted with the second end of the lever member 43d all the time, in this process, the lever member 43d rotates clockwise around its rotation center, and thus it is achievable that the lever member 43d drives the toggling tongue 42d to rotate anticlockwise around a pivotal axis, so that the electric motor 22 rotates from an inclined position to a vertical position. During this process, a lower end of an electric motor shaft 221 moves backwards gradually, so that a distance between the lower end of the electric motor shaft 221 and the brushroll 11 is increased, thus tensioning the drive belt 13.

Thus, the clutch device 400 for the upright vacuum cleaner 1 according to embodiments of the present disclosure has a simple structure and a low cost, and is easy to manufacture and process. By providing the lever member 43d of the clutch device 400 rotatably to the electric motor housing 21, and making the two ends of the lever member 43d fitted with the machine body assembly 300 and the electric motor 22 correspondingly, the objective of driving the electric motor 22 to rotate may be implemented, such that adjustment of a tension degree of the drive belt 13 may be implemented, normal working of dust sweep and dust suction may be ensured, and the operation may be steady and reliable along with a high working efficiency.

Advantageously, a lower end of the sliding track 41d is provided with a stopping block 411d so as to prevent the second end of the lever member 43d from slipping out of the lower end of the sliding track 41d. FIG. 15 illustrates that the second end of the lever member 43d is slidably provided in the sliding track 41d, and the lower end of the sliding track 41d is provided with the stopping block 411d which extends inwards along a radial direction of the sliding track 41d. When the second end of the lever member 43d slides to an end portion of a sliding groove, the lever member 43d abuts against the stopping block 411d. Thus, by providing the stopping block 411d to the lower end of the sliding track 41d, the second end of the lever member 43d may be prevented from slipping out of the sliding track 41d, thus ensuring connection reliability of the triggering assembly, further improving operational reliability of the clutch device 400 for the upright vacuum cleaner 1. Preferably, each of two ends of the sliding track 41d may be provided with the stopping block 411d so as to prevent the second end of the lever member 43d from slipping out of the two ends of the sliding track 41d.

The sliding track 41d extends along a curve. That is, the sliding track 41d is configured as a curve sliding track 41d. The second end of the lever member 43d slides back and forth along an arc length of the sliding track 41d, thereby implementing the objective that the bridging member 32 drives the lever member 43d to rotate and the lever member 43d drives the electric motor 22 to rotate. Preferably, the sliding track 41d extends along an arc line of which a center axis is configured as a rotation axis of the machine body assembly 300. FIG. 17 illustrates that, a contour line of the sliding track 41d is formed as an arc shape extending along a circumferential direction of the rotation center of the lever member 43d. When the bridging member 32 of the machine body assembly 300 rotates around its rotation center, as the second end of the lever member 43d is within the sliding track 41d all the time, the bridging member 32 drives the lever member 43d to rotate around the rotation center of the lever member 43d by the sliding track 41d on the bridging member 32, so that the first end of the lever member 43d drives the toggling tongue 42d to rotate, thus implementing the objective of driving the electric motor 22 to rotate.

Optionally, the first end of the lever member 43d is configured as a hook 431d, the end of the toggling tongue 42d is engaged in the hook 431d. FIG. 18 illustrates that, the first end of the lever member 43d is configured as the hook 431d of which an opening faces the toggling tongue 42d. When the machine body 31 is operated by hand from a second vertical position to a second inclined position (inclined backwards as shown in FIG. 18), the sliding track 41d on the bridging member 32 generates the clockwise rotation with respect to the lever member 43d. As the sliding track 41d is fitted with the second end of the lever member 43d all the time, in this process, the lever member 43d rotates clockwise around its rotation center. The hook 431d on the lever member 43d is engaged with the toggling tongue 42d so as to drive the toggling tongue 42d to rotate anticlockwise around the pivotal axis, thus driving the electric motor 22 to rotate from a first inclined position to a first vertical position, so as to tension the drive belt 13.

Specifically, according to an embodiment of the present disclosure, the toggling tongue 42d includes a rotating portion 421d and a tongue portion 422d. One of the rotating portion 421d and the electric motor housing 21 is provided with a rotating shaft 44d, and the other one of the rotating portion 421d and the electric motor housing 21 is provided with a rotating shaft hole configured to be rotatably fitted with the rotating shaft 44d. A first end of the tongue portion 422d is connected to the rotating portion 421d and a second end thereof extends along a curve facing a direction away from the rotating portion 421d. The second end of the tongue portion 422d is fitted with the first end of the lever member 43d.

Figure 21:
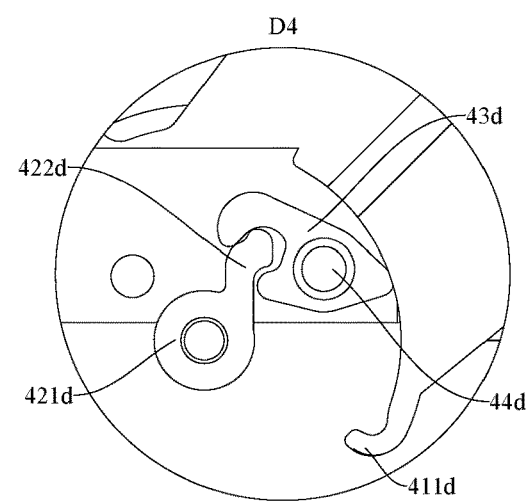
FIG. 21 is an enlarged view of a portion denoted by D4 shown in FIG. 20.

FIG. 21 illustrates that, the toggling tongue 42d mainly includes the rotating portion 421d and the tongue portion 422d. The first end of the tongue portion 422d is connected to a side wall of the rotating portion 421d, and the second end of the tongue portion 422d extends in a direction away from a center of the rotating portion 421d. The toggling tongue 42d is fixedly provided to the electric motor casing 222 of the electric motor 22. Further, the rotating shaft 44d is provided to an inner wall of the electric motor housing 21 corresponding to the electric motor casing 222, and the rotating portion 421d is provided with the rotating shaft hole configured to be fitted with the rotating shaft 44d. When the electric motor assembly 200, the machine body assembly 300 and the lever member 43d are assembled completely, a free end of the tongue portion 422d is engaged in the hook 431d of the lever member 43d. Thus, the hook 431d of the lever member 43d is fitted with the tongue portion 422d of the toggling tongue 42d, and connection reliability between the lever member 43d and the toggling tongue 42d is improved to ensure the stability and reliability of the transmission of movement and power, thereby ensuring the normal working of the clutch device 400.

Preferably, according to an embodiment of the present disclosure, the toggling tongue 42d is integrally formed with the electric motor casing 222 of the electric motor 22. Thus, an integral structure may not only ensure the structural stability and performance stability of the upright vacuum cleaner 1, but also be convenient to form and easy to manufacture, and moreover excessive assembly parts and connection processes are omitted, the assembly efficiency of the upright vacuum cleaner 1 is greatly improved and the connection reliability between the toggling tongue 42d and the electric motor casing 222 is ensured. Furthermore, the integral structure has higher overall strength and stability, is more convenient to assembly and has a longer service life.

In some specific embodiments of the present disclosure, the lever member 43d is rotatably connected to a side wall of the electric motor housing 21. Referring to FIGS. 14-21, the side wall of the electric motor housing 21 extends along a vertical direction (an up-down direction as shown in FIG. 14). The lever member 43d is provided to the side wall of the electric motor housing 21 and is rotatable in the vertical side wall of the electric motor housing 21, that is, a rotation axis of the lever member 43d is perpendicular to a vertical plane where the lever member 43d is.

Specifically, as shown in FIG. 14, the toggling tongue 42d is fixedly provided to the electric motor casing 222 of the electric motor 22. For example, the electric motor casing 222 of the electric motor 22 is provided with a bracket, and the toggling tongue 42d is fixedly provided to the bracket. A side of the electric motor housing 21 corresponding to the electric motor casing 222 of the electric motor 22 is provided with the rotating shaft 44d for mounting the toggling tongue 42d. The toggling tongue 42d on the electric motor casing 222 of the electric motor 22 is sleeved over the rotating shaft 44d on the electric motor housing 21, and the toggling tongue 42d is rotatable with respect to the electric motor housing 21, that is, the electric motor 22 is able to be rotatably connected to the electric motor housing 21 by the fitting between the toggling tongue 42d and the rotating shaft 44d. The sliding track 41d is fixedly provided to a side wall of the bridging member 32, the first end of the lever member 43d is fitted with the toggling tongue 42d, and the second end of the lever member 43d is fitted with sliding track 41d.

When the machine body 31 is operated by hand from the second vertical position to the second inclined position (inclined backwards as shown in FIG. 18), the bridging member 32 on the electric motor housing 21 generates the clockwise rotation with respect to the electric motor housing 21, and thus the sliding track 41d on the bridging member 32 generates the clockwise rotation with respect to the lever member 43d. As the sliding track 41d is fitted with the second end of the lever member 43d all the time, in this process, the lever member 43d rotates clockwise around its rotation center, and thus it is achievable that the lever member 43d drives the toggling tongue 42d to rotate anticlockwise around the pivotal axis, so that the electric motor 22 rotates from the first inclined position to the first vertical position. During this process, the lower end of the electric motor shaft 221 moves backwards gradually, so that distance between the lower end of the electric motor shaft 221 and the brushroll 11 is increased, thus tensioning the drive belt 13.

Advantageously, two lever members 43d are provided and are symmetrically disposed to two sides of the electric motor housing 21. That is, two opposite inner side walls (such as a left side wall and a right side wall as shown in FIG. 1) of the electric motor housing 21 are provided with two lever members 43d which are symmetrically disposed, and each lever member 43d is pivotal within the vertical plane. The electric motor casing 222 of the electric motor 22 is correspondingly provided with two toggling tongues 42d which are symmetrically disposed, and the bridging member 32 is correspondingly provided with two sliding tracks 41d which are symmetrically disposed. Each lever member 43d is fitted with the toggling tongue 42d and the sliding track 41d at a corresponding position, and all of them together drive the electric motor 22 in the electric motor housing 21 to rotate.

Certainly, the present disclosure is not limited to this. That is, the two lever members 43d may also be rotatably connected in a top wall of the electric motor housing 21 and may be pivotal within a horizontal plane, and the two toggling tongues 42d and the two sliding tracks 41d abut against the lever members 43d at corresponding positions all the time, thereby implementing the transmission of movement and power. Thus, by the clutch devices 400 axially symmetrically arranged at two sides of a center line of the electric motor assembly 200, not only a system may be provided with sufficient driving force for driving the electric motor 22, reducing a force on a single lever member 43d and enhancing operational reliability of the lever members 43d, but also the force may be evenly exerted on the electric motor 22 during rotation, ensuring the structural stability and thereby improving the operational reliability of the clutch device 400 for the upright vacuum cleaner 1.

An upright vacuum cleaner according to embodiments of a second aspect of the present disclosure will be described in the following with reference to FIGS. 1-23.

The upright vacuum cleaner 1 according to embodiments of the present disclosure includes the brushroll 11, the electric motor assembly 200, the machine body assembly 300 and the clutch device 400 according to the above embodiments. More particularly, the electric motor assembly 200 includes the electric motor housing 21 and the electric motor 22 disposed in the electric motor housing 21. The electric motor 22 drives the brushroll 11 to roll by the drive belt 13 and is rotatable between the first vertical position of tensioning the drive belt 13 and the first inclined position of loosening the drive belt 13.

Figure 2:
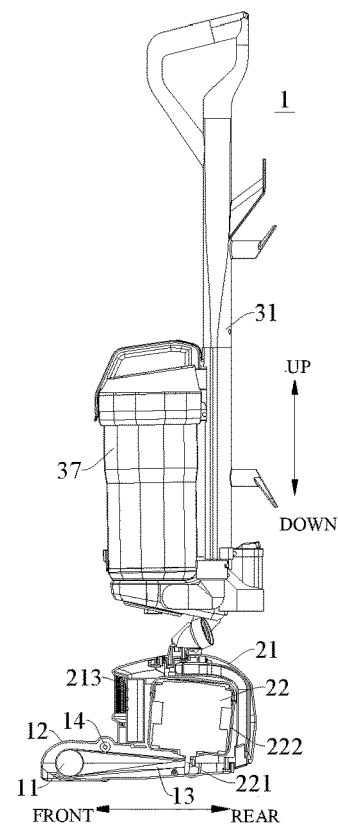
FIG. 2 is a lateral view of the upright vacuum cleaner shown in FIG. 1, in which an electric motor is at a first inclined position.
Figure 3:
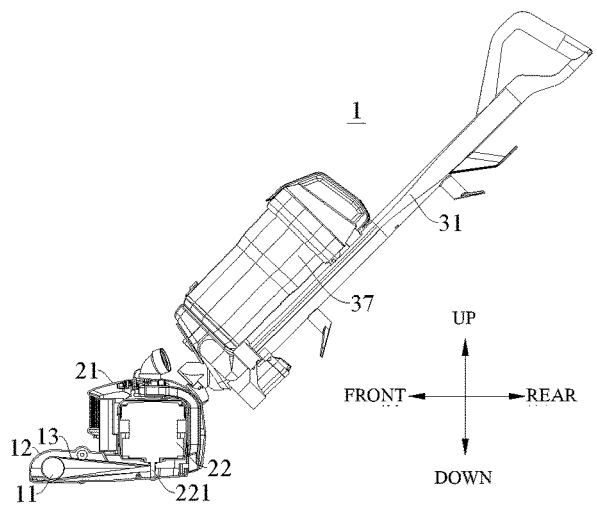
FIG. 3 a lateral view of the upright vacuum cleaner shown in FIG. 1, in which an electric motor is at a first vertical position.
Figure 4:
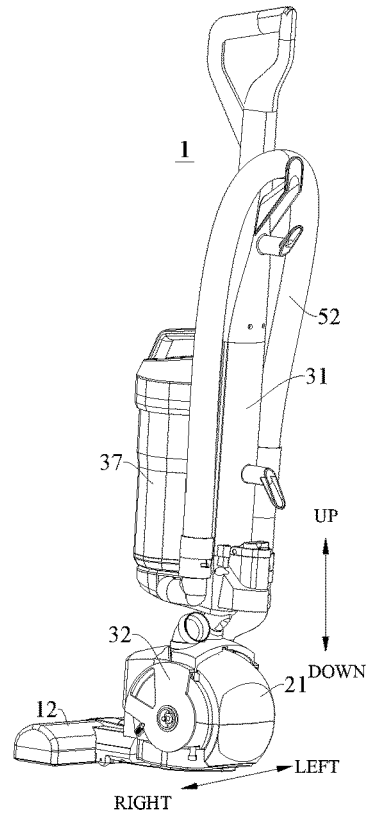
FIG. 4 is a schematic view of the upright vacuum cleaner shown in FIG. 1 from one direction.

In other words, the upright vacuum cleaner 1 mainly includes the brushroll 11, the electric motor assembly 200, the machine body assembly 300 and a lever cam member 41b, in which, the electric motor assembly 200 is connected to the brushroll 11, the machine body assembly 300 and the lever cam member 41b separately. Referring to FIG. 2 and FIG. 3, the electric motor assembly 200 mainly includes the electric motor 22 and the electric motor housing 21, in which the accommodating cavity for mounting the electric motor 22 is defined in the electric motor housing 21, and the electric motor 22 is movably disposed in the accommodating cavity and is pivotal with respect to the electric motor housing 21. The electric motor 22 may drive the fan to rotate so as to generate the air flow for dust suction, thereby providing the upright vacuum cleaner 1 with the vacuuming power. The electric motor 22 may further drive the brushroll 11 to rotate around its own axis, thereby implementing the objective of cleaning the floor. Specifically, the drive belt 13 is disposed between the electric motor 22 and the brushroll 11 and is in connection with the electric motor 22 and the brushroll 11, such that the electric motor 22 drives the brushroll 11 by the drive belt 13.

The machine body assembly 300 includes the machine body 31 and the bridging member 32 mounted to the machine body 31, and the bridging member 32 is rotatably connected to the electric motor housing 21 so that the machine body 31 is rotatable between the second vertical position and the second inclined position.

Figure 5:
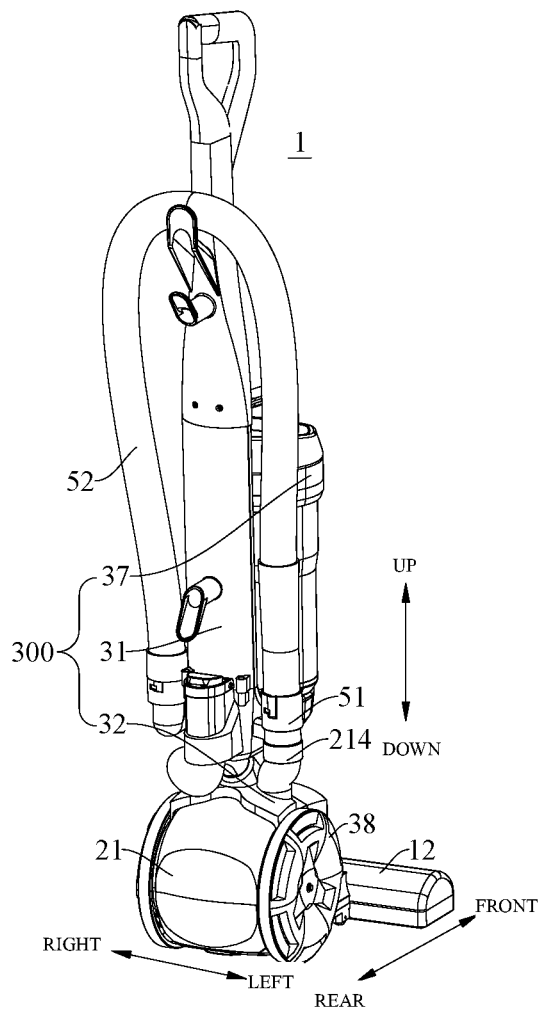
FIG. 5 is a schematic view of an upright vacuum cleaner according to another embodiment of the present disclosure.
Figure 6:
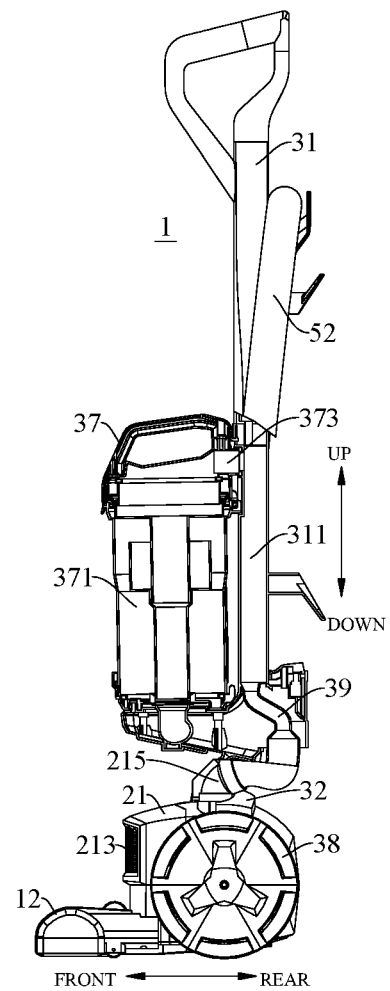
FIG. 6 is a lateral view of the upright vacuum cleaner shown in FIG. 5.

Referring to FIG. 5, the machine body assembly 300 mainly includes the machine body 31 and the bridging member 32, in which, the machine body 31 is arranged along a vertical direction, the bridging member 32 is disposed below the machine body 31 and connected to a lower end of the machine body 31, and the bridging member 32 is mounted to the electric motor housing 21 and is pivotal with respect to the electric motor housing 21. When a handle of the machine body 31 is operated by hand, and for example, the machine body 31 is operated from the second vertical position to the second inclined position, the bridging member 32 generates rotation with respect to the electric motor housing 21 so as to drive the electric motor 22 to rotate from the first inclined position to the first vertical position.

Further, the clutch device 400 is disposed between the bridging member 32 and the electric motor 22, and when the machine body 31 is moved from the second vertical position to the second inclined position, the bridging member 32 drives the electric motor 22 to move from the first inclined position to the first vertical position by the clutch device 400. Referring to FIG. 14-FIG. 21, the lever cam member 41b is connected to the bridging member 32 and the electric motor casing 222 of the electric motor 22. When the machine body 31 is at the second vertical position, an axis of the electric motor shaft 221 of the electric motor 22 is inclined backwards with respect to an axis of the electric motor housing 21, i.e. the electric motor 22 is at the first inclined position, in which case two ends of the drive belt 13 are fitted over the brushroll 11 and the electric motor shaft 221 respectively, but the drive belt 13 is in a loosened state. When the machine body 31 is at the second inclined position, the axis of the electric motor 22 extends along the vertical direction, i.e. the electric motor 22 is at the first vertical position, in which case the drive belt 13 is tensioned.

More specifically, when the machine body 31 is rotated by hand from the second vertical position to the second inclined position, the bridging member 32 on the electric motor housing 21 generates the rotation with respect to the electric motor housing 21 and drives the electric motor 22 to rotate from the first inclined position to the first vertical position by the lever cam member 41b. During this process, the lower end of the electric motor shaft 221 moves backwards gradually, so that the distance between the lower end of the electric motor shaft 221 and the brushroll 11 is increased, thereby tensioning the drive belt 13 and reaching the objective of starting actions of dust sweep and dust suction.

In the present embodiment, when the machine body 31 is operated from the second vertical position to the second inclined position with a predetermined angle, the electric motor 22 may rotate synchronously with the machine body 31. When the electric motor 22 rotates by the predetermined angle, the machine body 31 may be operated freely by hand without influencing the tensioned state of the drive belt 13. That is, when the electric motor 22 is rotated from the first inclined position to the first vertical position, the machine body 31 may be operated freely by hand without influencing dust sweep and dust suction of the upright vacuum cleaner 1. Certainly, the present disclosure is not limited to this, a rotation angle of the machine body 31 may also be related to a rotation angle of the electric motor 22, that is, by adjusting an inclined angle of the machine body 31, adjustment of the position state of the electric motor 22 may be implemented by hand, thereby achieving the objective of adjusting the tension degree of the drive belt 13.

As the clutch device 400 for the upright vacuum cleaner 1 according to embodiments of the present disclosure has the above technical effects, the upright vacuum cleaner 1 according to embodiments of the present disclosure has also the above technical effects. That is, the electric motor 22 of the upright vacuum cleaner 1 may control rotation of the brushroll 11 and that of the fan at the same time, the number of parts is reduced, the occupied space is small, and synchronous control over dust sweep and dust suction may be implemented, such that the upright vacuum cleaner 1 has a simple and compact structure, occupies a small space and is easy to operate. Furthermore, the electric motor of the upright vacuum cleaner 1 is arranged vertically, which may reduce the occupied space of the upright vacuum cleaner 1 and facilitate diverse arrangements of various parts of the upright vacuum cleaner 1.

In addition, by disposing the clutch device 400 between the bridging member 32 and the electric motor 22, the objective of driving the electric motor 22 to rotate may be implemented, thereby implementing adjustment of the tension degree of the drive belt 13, ensuring normal working of dust sweep and dust suction, facilitating the assembly and the disassembly, and making the operation steady and reliable and the working efficiency high. Furthermore, the electric motor of the upright vacuum cleaner 1 is arranged vertically, which may reduce the occupied space of the upright vacuum cleaner 1, facilitate diverse arrangements of various parts of the upright vacuum cleaner 1, facilitate the operation and decrease the occupied space.

According to an embodiment of the present disclosure, the angle by which the electric motor 22 is rotated from the first inclined position to the first vertical position ranges from 1° to 10°. Referring to FIG. 2, when the machine body 31 is at the second vertical position, the axis of the electric motor shaft 221 of the electric motor 22 is inclined backwards with respect to the axis of the electric motor housing 21, that is, the electric motor 22 is at the first inclined position with the inclined angle of 1° to 10°. For example, the inclined angle may be configured as 1°, 6° or 10°. In such a case, both ends of the drive belt 13 are fitted over the brushroll 11 and the electric motor shaft 221 respectively, but the drive belt 13 is in the loosened state. Referring to FIG. 3, when the machine body 31 is at the second inclined position, the axis of the electric motor 22 extends along the vertical direction, i.e. the electric motor 22 is at the first vertical position, in which case the drive belt 13 is tensioned.

When the machine body 31 is operated from the second vertical position to the second inclined position with the predetermined angle, the electric motor 22 may rotate synchronously with the machine body 31. When the electric motor 22 rotates by the predetermined angle, the electric motor 22 is rotated from the first inclined position to the first vertical position, and the drive belt 13 is in the tensioned state. After this, the machine body 31 may be operated freely by hand, and the drive belt 13 is in the tensioned state all the time, ensuring the normal working of dust sweep and dust suction of the upright vacuum cleaner 1. When the machine body 31 is rotated from the second inclined position to the second vertical position by hand, the drive belt 13 is loosened, the upright vacuum cleaner 1 stops sweeping and sucking the dust.

Optionally, according to an embodiment of the present disclosure, the angle by which the electric motor 22 is rotated from the first inclined position to the first vertical position ranges from 3° to 8°. For example, when the upright vacuum cleaner 1 is in an initial state (i.e. the machine body 31 is at the second vertical position), a center axis of the electric motor 22 is inclined backwards by 3°-8° with respect to the vertical direction (such as the up-down direction shown in FIG. 2), and when the machine body 31 is pulled backwards by hand, the electric motor 22 rotates synchronously with the machine body 31 within an initial angle range (3°-8°). When the electric motor 22 is rotated to the first vertical position, the machined body 31 may be wiggled freely within a certain angle range so as to adjust the moving direction of the upright vacuum cleaner 1, and at this time, the upright vacuum cleaner 1 starts vacuuming. When the machine body 31 is pulled forwards by hand, the machine body 31 is rotated from the second inclined position with the predetermined angle with respect to the vertical direction to the first vertical position, the electric motor 22 is rotated from the first vertical position to the first inclined position with the predetermined angle, the drive belt 13 is changed from the tensioned state to the relaxed state and the vacuum cleaner stops vacuuming.

Preferably, according to an embodiment of the present disclosure, the angle by which the electric motor 22 is rotated from the first inclined position to the first vertical position is configured to be 5°. Thus, the drive belt 13 is tensioned to an appropriate extent, which not only ensures the reliability and stability for operating the system, but also avoids accelerated failure of the drive belt 13 due to excessive tension so as to extend the service life of the drive belt 13.

The upright vacuum cleaner 1 further includes a tensioning pulley 14 or an elastic element for adjusting the tension degree of the drive belt 13. Referring to FIG. 2, a top wall of a brushroll casing 12 of the upright vacuum cleaner 1 is provided with the tensioning pulley 14. The tensioning pulley 14 is located above the drive belt 13 and adjacent to the brushroll 11 so as to adjust the tension degree of the drive belt 13. Further, an inner top wall of the brushroll casing 12 is also provided with the elastic element, and two ends of the elastic element are connected to the brushroll casing 12 and the tensioning pulley 14 respectively, so that the elastic element and the tensioning pulley 14 may tension the drive belt 13 according to an actual working condition, thus ensuring the reliability of operating the system.

Thus, by disposing the tensioning pulley 14 or the elastic element in the brushroll casing 12, not only the tensioning of the drive belt 13 may be adjusted to make a transmission system operate reliably, but also the drive belt 13 may operate more stably to be prevented from slipping, so as to ensure the normal working of the upright vacuum cleaner 1.

In some specific embodiments of the present disclosure, the bridging member 32 and the machine body 31 are separately formed and connected by assembling. Referring to FIG. 1, a sleeve is dispose at a middle portion of the bridging member 32, and the bridging member 32 is sleeved over the machine body 31 by the sleeve. Thus, when the machine body 31 is manipulated by a user, the upright vacuum cleaner 1 is easy to change the direction and is easy to operate.

In some other specific embodiments of the present disclosure, the bridging member 32 and the machine body 31 are processed and formed integrally. Thus, an integral structure may not only ensure the structural stability and performance stability of the upright vacuum cleaner 1, but also be convenient to form and easy to manufacture, and moreover excessive assembly parts and connection processes are omitted, which improves the assembly efficiency of the upright vacuum cleaner 1 greatly and ensures the connection reliability between the bridging member 32 and the machine body 31. Furthermore, the integral structure has higher overall strength and stability, is more convenient to assemble and has a longer service life.

A rotation axis of the electric motor 22 is disposed non-parallel to a rotation axis of the brushroll 11, the electric motor 22 drives the brushroll 11 to roll by the drive belt 13. Specifically, as shown in FIG. 1, the rotation axis of the brushroll 11 extends along a horizontal direction (a left-right direction shown in FIG. 1), and the rotation axis of the electric motor 22 is disposed non-parallel to the rotation axis of the brushroll 11. For example, the rotation axis of the electric motor 22 may extend along the vertical direction (the up-down direction shown in FIG. 2), and may also be disposed obliquely with respect to the vertical direction. The drive belt 13 is disposed between the electric motor 22 and the brushroll 11, the drive belt 13 is twined around the electric motor shaft 221 of the electric motor 22 and the brushroll 11 so as to drive the brushroll 11.

Optionally, the electric motor 22 may be disposed adjacent to the floor, that is, a center of gravity of the electric motor 22 is lower than the center of gravity of the electric motor 22 of the vacuum cleaner in the related art, such that with regard to the vacuum cleaner having the machine body 31 of the same length, the upright vacuum cleaner 1 of the present disclosure is easy for the user to operate with less effort. The start and stop of the upright vacuum cleaner 1 is implemented by manual control over a switch on the machine body 31 of the upright vacuum cleaner 1. When the upright vacuum cleaner 1 is started, the electric motor 22 drives the fan and the brushroll 11 to rotate at the same time, thereby providing the power for dust suction. The user can complete various operations simply and conveniently by one button.

Thus, by disposing the rotation axis of the electric motor 22 non-parallel to the rotation axis of the brushroll 11, the volume of the electric motor 22 may be reduced, thus reducing the occupied space of the upright vacuum cleaner 1, and facilitating diverse arrangements of various parts of the upright vacuum cleaner 1. Moreover, the upright vacuum cleaner 1 controls the brushroll 11 and the fan to rotate at the same time by one electric motor 22, such that the number of parts is reduced, the occupied space is small, and the synchronous control over dust sweep and dust suction may be implemented. Furthermore, the electric motor of the upright vacuum cleaner 1 is arranged vertically, which may reduce the occupied space of the upright vacuum cleaner 1 and facilitate diverse arrangements of various parts of the upright vacuum cleaner 1. The upright vacuum cleaner 1 has a simple and compact structure, occupies a small space and is easy to operate.

In an embodiment of the present disclosure, the rotation axis of the electric motor 22 is disposed perpendicular to the rotation axis of the brushroll 11, i.e. the rotation axis of the brushroll 11 is disposed perpendicular to the electric motor shaft 221, and the drive belt 13 is provided at a twist angle of 90°. Referring to FIG. 1, the brushroll 11 is arranged in the vertical plane, and the rotation axis of the brushroll 11 extends along the vertical direction. The electric motor 22 is disposed vertically in the electric motor housing 21, and the electric motor shaft 221 of the electric motor 22 is disposed in the vertical plane perpendicular to the rotation axis of the brushroll 11, that is, the rotation axis of the electric motor shaft 221 of the electric motor 22 and the rotation axis of the brushroll 11 are perpendicular to each other. Thus, an upper half of the drive belt 13 and a lower half of the drive belt 13 are both twisted between the brushroll 11 and the electric motor shaft 221, and the twisted angle of two ends of each half of the drive belt 13 is configured as 90°.

Optionally, according to an embodiment of the present disclosure, the electric motor shaft 221 of the electric motor 22 is disposed vertically. Specifically, the electric motor 22 mainly includes an electric motor body and the electric motor casing 222. The electric motor body is disposed in the electric motor casing 222, and mainly includes a motor core and the electric motor shaft 221. The electric motor shaft 221 of the electric motor 22 is connected to the motor core of the electric motor 22, and the electric motor 22 is arranged vertically. When the upright vacuum cleaner 1 is under a non-working state, an upper end of the electric motor shaft 221 is inclined backwards with respect to the vertical direction (the up-down direction shown in FIG. 3). When the upright vacuum cleaner 1 is vacuuming, a center axis of the electric motor shaft 221 extends along the vertical direction, that is, the lower end of the electric motor shaft 221 of the upright vacuum cleaner 1 may extend downwards with respect to the motor core along the vertical direction (the up-down direction shown in FIG. 3). A first end of the drive belt 13 is fitted over the lower end of the electric motor shaft 221, and a second end of the drive belt 13 is fitted over the brushroll 11. As the rotation axis of the brushroll 11 is arranged in the vertical plane, the drive belt 13 is twisted at least one time between the brushroll 11 and the electric motor shaft 221, i.e. the twist angle of the drive belt 13 between an alterable contact point of the drive belt 13 with the electric motor shaft 221 and an alterable contact point of the drive belt 13 with the brushroll 11 is configured as 90°.

When the machine body 31 is at the vertical position, the axis of the electric motor shaft 221 of the electric motor 22 is inclined backwards with respect to the axis of the electric motor housing 21. In such a case, the two ends of the drive belt 13 are fitted over the brushroll 11 and the electric motor shaft 221 respectively, but the drive belt 13 is in the loosened state. When the machine body 31 is at the inclined position, the axis of the electric motor 22 extends along the vertical direction, i.e. the electric motor 22 is at the vertical position, and at this time, the drive belt 13 is tensioned. Specifically, when the machine body 31 is operated by hand from the vertical position to the inclined position, the lower end of the electric motor shaft 221 moves backwards gradually, so that the distance between the lower end of the electric motor shaft 221 and the brushroll 11 is increased, thereby tensioning the drive belt 13.

The brushroll 11 includes a first brushroll segment 111 provided with bristle, a second brushroll segment 112 provided with bristle, and a connecting shaft segment 113 connected between the first brushroll segment 111 and the second brushroll segment 112. In other words, the brushroll 11 mainly includes the first brushroll segment 111, the second brushroll segment 112 and the connecting shaft segment 113, in which an end of the first brushroll segment 111 and an end of the second brushroll segment 112 are connected to two ends of the connecting shaft segment 113 correspondingly.

Figure 22:
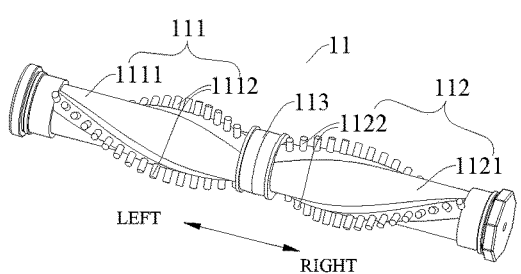
FIG. 22 is a schematic view of a brushroll of an upright vacuum cleaner according to embodiments of the present disclosure.

Referring to FIG. 1 and FIG. 2, the brushroll 11 is rotatably disposed in the brushroll casing 12, and the electric motor 22 is connected to the brushroll 11 so as to drive the brushroll 11 to rotate around its rotation axis. Each of the first brushroll segment 111, the second brushroll segment 112 and the connecting shaft segment 113 of the brushroll 11 is configured as a column shape extending along the horizontal direction (the left-right direction as shown in FIG. 22). A right end of the first brushroll segment 111 is connected to a left end of the connecting shaft segment 113, and a left end of the second brushroll segment 112 is connected to a right end of the connecting shaft segment 113. Outer side walls of the first brushroll segment 111 and the second brushroll segment 112 may be provided with the bristle so as to clean the floor. The connecting shaft segment 113 is not provided with the bristle so as to be convenient for connection with the drive belt 13.

Furthermore, the drive belt 13 is twined around the electric motor shaft 221 of the electric motor 22 and the connecting shaft segment 113 so that the electric motor 22 may drive the brushroll 11 to rotate. Referring to FIG. 2, the electric motor 22 is disposed in the electric motor housing 21 of the vacuum cleaner, and the electric motor 22 is connected to the fan and the brushroll 11. The electric motor 22 may drive the fan to rotate to generate the air flow, thereby providing the vacuuming power, and the electric motor 22 may drive the brushroll 11 to rotate around its own axis, thereby implementing the objective of cleaning the floor.

Referring to FIG. 2, the brushroll 11 and the electric motor 22 are spaced apart from each other along a front-rear direction, and the brushroll 11 is located in front of the electric motor 22. The first end of the drive belt 13 is fitted over the electric motor shaft 221 of the electric motor 22 and the second end of the drive belt 13 is fitted over the connecting shaft segment 113 of the brushroll 11. When the electric motor shaft 221 of the electric motor 22 rotates, due to friction resistance between the electric motor shaft 221 and a belt surface of the drive belt 13, the electric motor shaft 221 drives the drive belt 13 to rotate. Likewise, as the friction resistance is provided between the connecting shaft segment 113 of the brushroll 11 and the belt surface of the drive belt 13, the drive belt 13 drives the brushroll 11 to rotate around its own axis. Thus the electric motor 22 is able to drive the brushroll to rotate.

Preferably, according to an embodiment of the present disclosure, the first brushroll 11 and the second brushroll 11 are symmetrical with respect to the drive belt 13. That is, a length of the first brushroll segment 111 in an axial direction is equal to a length of the second brushroll segment 112 in the axial direction. The first brushroll segment 111 and the second brushroll segment 112 are symmetrical relative to a central portion of the connecting shaft segment 113. The second end of the drive belt 13 is twined around the connecting shaft segment 113 and the first end of the drive belt 13 is twined around the electric motor shaft 221 of the electric motor 22, i.e. the drive belt 13 divides the brushroll 11 into the first brushroll segment 111 and the second brushroll segment 112 which are symmetrical in the left-right direction. Thus, not only the first brushroll segment 111 and the second brushroll segment 112 are subject to balanced resistance so as to ensure the stability of the rotation of the brushroll 11, but also sweeping areas at both sides of the drive belt 13 are equal.

Furthermore, respective center axes of the first brushroll segment 111, the second brushroll segment 112 and the connecting shaft segment 113 are in the same line. That is, the first brushroll segment 111, the second brushroll segment 112 and the connecting shaft segment 113 are disposed coaxially. The electric motor 22 drives the first brushroll segment 111, the second brushroll segment 112 and the connecting shaft segment 113 to rotate at the same time. Thus, the electric motor 22 of the upright vacuum cleaner 1 may drive the fan, the first brushroll segment 111, the second brushroll segment 112 and the connecting shaft segment 113 to rotate at the same time, thus implementing a working mode of dust sweep and dust suction at both sides of the drive belt 13. Compared to the vacuum cleaner of the relate art that controls the fan and the brushroll 11 to rotate by two electric motors 22 respectively, the upright vacuum cleaner 1 has the simple structure and few parts, occupies the small space, and is easy to assemble and disassemble with the high mounting efficiency, and moreover, the synchronous control over the dust sweep and the dust suction may be implemented.

Figure 7:
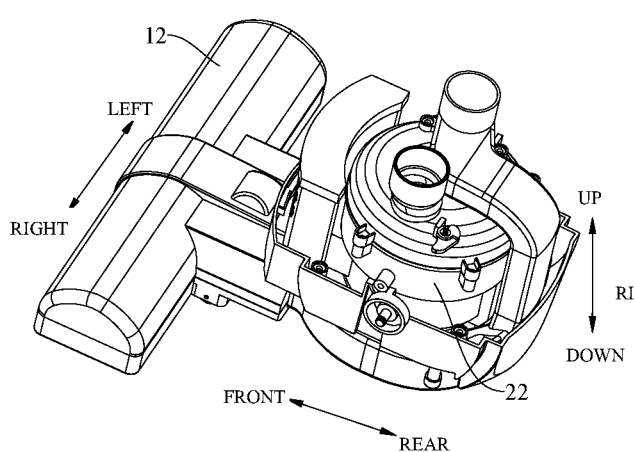
FIG. 7 is an assembly view of a brushroll assembly and an electric motor assembly of an upright vacuum cleaner according to an embodiment of the present disclosure.
Figure 8:
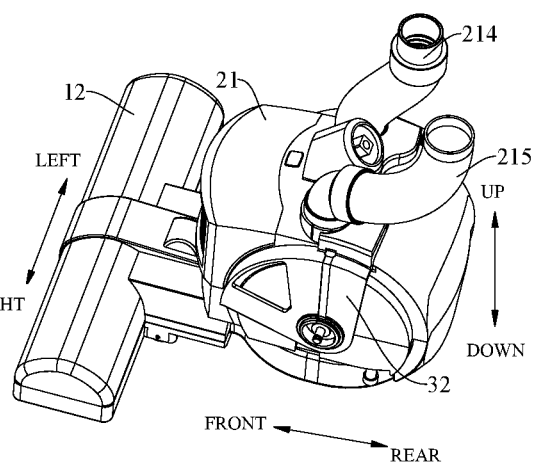
FIG. 8 is an assembly view of a brushroll assembly and an electric motor assembly of an upright vacuum cleaner according to another embodiment of the present disclosure.
Figure 9:
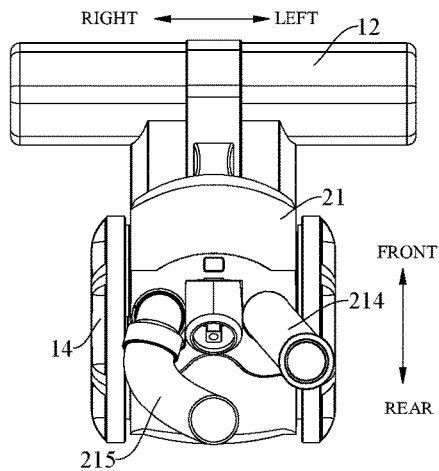
FIG. 9 is a top view of the structure shown in FIG. 8.

Furthermore, the upright vacuum cleaner 1 also includes the brushroll casing 12 covering the brushroll 11. The brushroll casing 12 is provided with a drive belt mounting cavity 123 for accommodating the connecting shaft segment 113 and the drive belt 13, and a first air suction flow passage 1221 and a second air suction flow passage 1222 located at two sides of the mounting cavity and spaced apart from the mounting cavity in the brushroll casing 12. Referring to FIG. 7-FIG. 9, the brushroll casing 12 is formed to be T-shaped, in which, the brushroll casing 12 is provided with the first air suction flow passage 1221, the second air suction flow passage 1222 and the drive belt mounting cavity 123 spaced apart from each other in the left-right direction in the brushroll casing 12. The first brushroll segment 111 is rotatably disposed in the first air suction flow passage 1221, the second brushroll segment 112 is rotatably disposed in the second air suction flow passage 1222, and the drive belt 13 is rotatably disposed in the drive belt mounting cavity 123.

Optionally, the first air suction flow passage 1221 and the second air suction flow passage 1222 which are spaced apart from each other are disposed at the left side and the right side of the drive belt 13 correspondingly, so that dirty air, dust and the like which are sucked from a dust suction inlet of the brushroll casing 12 may enter the first air suction flow passage 1221 and the second air suction flow passage 1222, then converge and flow into a dust cup 37. Specifically, the first air suction flow passage 1221 and the second air suction flow passage 1222 may be defined by parts disposed in the brushroll casing 12, and also may be defined by an inner wall surface of the brushroll casing 12. Certainly, the present disclosure is not limited to this, the first air suction flow passage 1221 and the second air suction flow passage 1222 may also be communicated with each other, i.e. all the space in the brushroll casing 12, apart from the space occupied by the drive belt mounting cavity 123, belongs to the first air suction flow passage 1221 and the second air suction flow passage 1222, and the dirty air, dust and the like which are sucked from the dust suction inlet of the brushroll casing 12 may be transported into the dust cup 37 through the drive belt mounting cavity 123.

Figure 11:
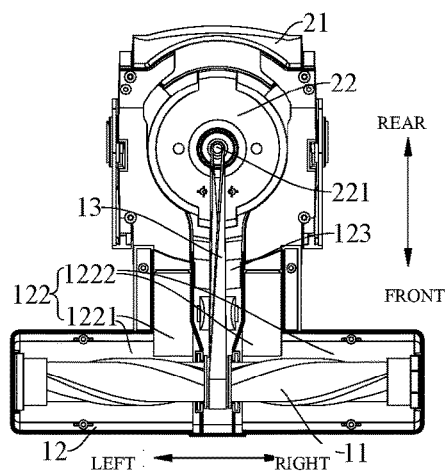
FIG. 11 is a bottom view of the structure shown in FIG. 7.
Figure 12:
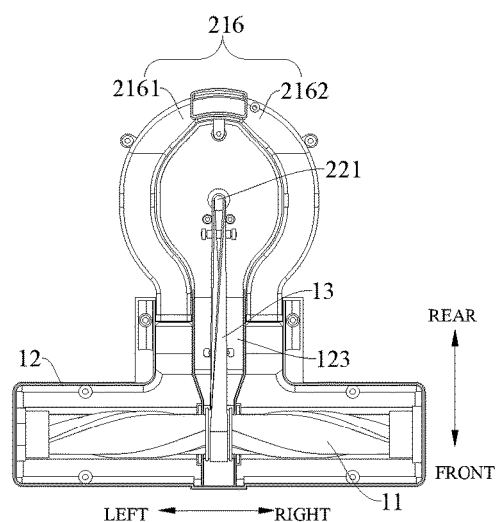
FIG. 12 is a schematic view of a flow passage in the structure shown in FIG. 11.
Figure 13:
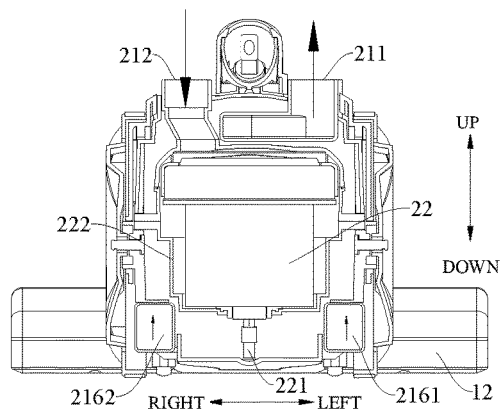
FIG. 13 is a rear view of a flow passage in the structure shown in FIG. 8.

As shown in FIG. 11, each of the first air suction flow passage 1221 and the second air suction flow passage 1222 includes a transverse air suction flow passage segment and a longitudinal air suction flow passage segment. The transverse air suction flow passage segment extends along an axial direction of the brushroll 11, and the longitudinal air suction flow passage segment extends along a direction which is perpendicular to the axial direction of the brushroll 11 and is communicated with the corresponding transverse air suction flow passage segment.

Specifically, the first air suction flow passage 1221 mainly includes the transverse air suction flow passage segment located at the left side of the connecting shaft segment 113 and the longitudinal air suction flow passage segment located at the left side of the drive belt 13, and the second air suction flow passage 1222 mainly includes the transverse air suction flow passage segment located at the right side of the connecting shaft segment 113 and the longitudinal air suction flow passage segment located at the right side of the drive belt 13. Moreover, a center line of each transverse air suction flow passage segment is perpendicular to a center line of the longitudinal air suction flow passage segment at a corresponding position.

Optionally, the first air suction flow passage 1221 and the second air suction flow passage 1222 are configured to be L-shaped separately and disposed back to back, and the drive belt mounting cavity 123 is located between the first air suction flow passage 1221 and the second air suction flow passage 1222. When the brushroll 11 is mounted in the brushroll casing 12, the first brushroll segment 111 may be rotatably disposed in the first air suction flow passage 1221, the second brushroll segment 112 may be rotatably disposed in the second air suction flow passage 1222, and the electric motor 22 drives the first brushroll segment 111 and the second brushroll segment 112 to rotate synchronously by the drive belt 13.

Furthermore, the electric motor housing 21 defines a first branch flow passage 2161 communicated with the first air suction flow passage 1221 and a second branch flow passage 2162 communicated with the second air suction flow passage 1222. Specifically, the electric motor housing 21 is formed as a hollow column, and internally defines the first branch flow passage 2161 and the second branch flow passage 2162 which are spaced apart from each other. The electric motor 22 is located between the first branch flow passage 2161 and the second branch flow passage 2162, in which, a first end of the first branch flow passage 2161 is communicated with the first air suction flow passage 1221, a first end of the second branch flow passage 2162 is communicated with the second air suction flow passage 1222, while a second end of the first branch flow passage 2161 and a second of the second branch flow passage 2162 are communicated with the dust cup 37.

According to an embodiment of the present disclosure, the rolling casing 12 includes a lower casing 125 and an upper casing 124 connected to a top portion of the lower casing 125, and the first air suction flow passage 1221 and the second air suction flow passage 1222 are defined by the upper casing 124 and/or the lower casing 125. Referring to FIG. 2, the brushroll casing 12 mainly includes the upper casing 124 and the lower casing 125, in which, an lower end of the upper casing 124 is open, and the lower casing 125 is detachably connected to the upper casing 124 so as to close at least a part of an opening of the upper casing 124 and so as to define the dust suction inlet between the upper casing 124 and the lower casing 125. Furthermore, brushroll air suction flow passages 122 spaced apart from each other in the left-right direction and the drive belt mounting cavity 123 for mounting the drive belt 13 are defined between the upper casing 124 and the lower casing 125, in which, the brushroll air suction flow passages 122 include the first air suction flow passage 1221 and the second air suction flow passage 1222, and each of the first air suction flow passage 1221 and the second air suction flow passage 1222 is not communicated with the drive belt mounting cavity 123. Thus, debris such as dust may be prevented from being drawn into the drive belt 13, and the reliability of operation of the system is ensured. The brushroll casing 12 has a simple and compact structure, and the first air suction flow passage 1221, the second air suction flow passage 1222 and the drive belt mounting cavity 123 spaced apart from each other are defined by the structures of the upper casing 124 and the lower casing 125, which omits excessive pipes, makes the manufacturing simple and reduces the cost.

The upright vacuum cleaner 1 further includes an air inlet pipe assembly, in which, the air inlet pipe assembly mainly includes an air inlet pipe 51 and a hose 52. The air inlet pipe 51 is fixed to the electric motor housing 21 and has a first end communicated with a dirty air outlet 211 in the electric motor housing 21, a first end of the hose 52 is communicated with a second end of the air inlet pipe 51, and a second other end of the hose 52 is communicated with a separating chamber 371 of the dust cup 37. Advantageously, a length of the hose 52 may be larger than a length of the machine body 31, so as to extend the separation time and the filtration time of the dust and dirty air, thus increasing the dust suction capacity, so as to improve the working efficiency of the upright vacuum cleaner 1. Further, a middle portion of the hose 52 may be hung on the machine body 31 to make the structure compact. Optionally, the hose 52 may be configured as a plastic hose 52, or a rubber hose 52, so that coiling of the hose 52 is convenient, thereby saving the space and improving the space utilization.

A structure and a working process of the upright vacuum cleaner 1 according to embodiments of the present disclosure will be described in detail with reference to FIG. 1-FIG. 23 in the following.

As shown in FIG. 1-FIG. 23, the upright vacuum cleaner 1 mainly includes a brushroll assembly 100, the electric motor assembly 200, the machine body assembly 300, the clutch device 400 and a rolling wheel 38.

The brushroll assembly 100 mainly includes the brushroll 11 and the brushroll casing 12, and the brushroll casing 12 mainly includes the upper casing 124 and the lower casing 125. The drive belt mounting cavity 123, and the first air suction flow passage 1221 and the second air suction flow passage 1222 located at two sides of the drive belt mounting cavity 123 are defined in the brushroll casing 12. The brushroll 11 is rotatably disposed in the brushroll casing 12, the drive belt 13 is movably disposed in the drive belt mounting cavity 123 and the second end of the drive belt 13 is twined around the central portion of the brushroll 11.

Referring to FIG. 22, the brushroll 11 mainly includes the first brushroll segment 111, the second brushroll segment 112 and the connecting shaft segment 113 which are disposed coaxially. The first brushroll segment 111 and the second brushroll segment 112 are connected to the two ends of the connecting shaft segment 113 correspondingly. The first brushroll segment 111 mainly includes a first body 1111 and a first bristle 1112 provided to the first body 1111. The second brushroll segment 112 mainly includes a second body 1121 and a second bristle 1122 provided to the second body 1121. The second end of the drive belt 13 is twined around the connecting shaft segment 113 of the brushroll 11, and further, the brushroll casing 12 is provided with the tensioning pulley 14 so as to tension the drive belt 13.

The electric motor assembly 200 mainly includes the electric motor housing 21, the electric motor 22 and the fan (not shown). The electric motor housing 21 defines an electric motor air suction flow passage 216 and an electric motor air exhaust flow passage which are spaced from each other, and the electric motor housing 21 is provided with the dirty air outlet 211 communicated with the electric motor air suction flow passage 216 and a clean air inlet 212 communicated with the electric motor air exhaust flow passage. The electric motor 22 is vertically disposed in the electric motor housing 21 and is rotatable with respect to the electric motor housing 21, that is, the electric motor shaft 221 of the upright vacuum cleaner 1 is arranged along the vertical direction. The electric motor 22 is disposed in rear of the brushroll 11, and the electric motor shaft 221 of the electric motor 22 is connected with the brushroll 11 through the drive belt 13.

Figure 10:
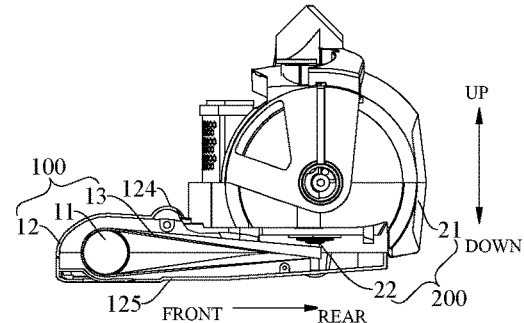
FIG. 10 is a lateral view of the structure shown in FIG. 7.

Specifically, the first end of the drive belt 13 is fitted over the electric motor shaft 221 of the electric motor 22, the second end of the drive belt 13 is fitted over brushroll 11. When the electric motor shaft 221 of the electric motor 22 rotates, the electric motor shaft 221 drives the drive belt 13 to rotate, and then the drive belt 13 drives the brushroll 11 to rotate around its own rotation axis. Thus, the electric motor 22 is able to drive the brushroll 11 to rotate. Referring to FIG. 10, as the axial direction of the electric motor shaft 221 of the electric motor 22 is non-parallel to the axial direction of the brushroll 11, the drive belt 13 between the brushroll 11 and the electric motor shaft 221 is twisted once with the twist angle of 30°-90°. Furthermore, the electric motor 22 may drive the fan to rotate so as to generate the air flow for dust suction, thereby providing upright vacuum cleaner 1 with the vacuuming power. The electric motor 22 may also drive the brushroll 11 to rotate around its own rotation axis, thereby implementing the objective of cleaning the floor.

Figure 23:
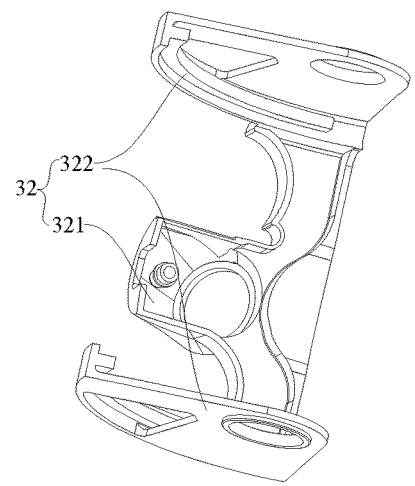
FIG. 23 is a schematic view of a bridging member of an upright vacuum cleaner according to embodiments of the present disclosure.

The machine body assembly 300 mainly includes the machine body 31, the bridging member 32 and the dust cup 37. The dust cup 37 and the bridging member 32 are provided to the machine body 31, and the bridging member 32 is connected with the lower end of the machine body 31. Referring to FIG. 23, the bridging member 32 mainly includes two lateral plates 322 and a top plate 321 disposed between the two lateral plates 322, and the two lateral plates 322 of the bridging member 32 are disposed outside a lateral wall of the electric motor housing 21 and are rotatably connected with the electric motor housing 21. The rotatable rolling wheel 38 is disposed outside the two lateral plates 322 of the bridging member 32, so that the user may push the upright vacuum cleaner 1 easily. The separating chamber 371 is defined in the dust cup 37, and the dust cup 37 is provided with an air inlet 372 and an air outlet 373 in communication with the separating chamber 371. The machine body air exhaust flow passage 311 is defined in the machine body 31. An air exhaust pipe 39 is disposed between the machine body 31 and the electric motor housing 21, two ends of the air exhaust pipe 39 are communicated with the machine body air exhaust flow passage 311 of the machine body 31 and the clean air inlet 212 of the electric motor housing 21 respectively. The dust and debris sucked from the dust suction inlet of the brushroll casing 12 enter the electric motor air suction flow passage 216 in the electric motor housing 21 through the first air suction flow passage 1221 and the second air suction flow passage 1222, and then enter the separating chamber 371 of the dust cup 37 for filtering process. The obtained clean air is discharged into the electric motor air exhaust flow passage in the electric motor housing 21 from the air outlet 373 of the dust cup 37 and is discharged to the external environment from an air exhaust hole 213 of the electric motor housing 21.

The lever member 43d of the clutch device 400 is rotatably provided to the electric motor housing 21 and is fitted with the bridging member 32 and the electric motor casing 222 of the electric motor 22, so that it is attainable that the bridging member 32 drives the lever member 43d of the clutch device 400 to rotate and the lever member 43d of the clutch device 400 drives the electric motor 22 to rotate.

Referring to FIG. 1, under a non-working state, the upright vacuum cleaner 1 may be vertically placed on the floor, that is, the machine body 31 of the upright vacuum cleaner 1 is at the second vertical position, which occupies the small space. When the user needs to use the upright vacuum cleaner 1, the handle of the machine body 31 may be held by hand so that the upright vacuum cleaner 1 may be pushed to work. Firstly, the switch on the upright vacuum cleaner 1 may be switched on by hand, in which case the drive belt 13 is in the loosened state, and the electric motor 22 is unable to drive the brushroll 11 to rotate, i.e. the upright vacuum cleaner 1 is in a standby state where the brushroll 11 does not sweep the dust. Then the machine body 31 is rotated from the second vertical position to the second inclined position by hand, and in this process, the bridging member 32 on the electric motor housing 21 rotates clockwise along with the machine body 31 with respect to the electric motor housing 21. Hence, the bridging member 32 is able to drive the electric motor 22 in the electric motor housing 21 to rotate through the clutch device 400 on the electric motor housing 21, i.e. the electric motor 22 rotates from the first inclined position to the first vertical position, and in this process, the lower end of the electric motor shaft 221 moves backwards gradually, so that the distance between the lower end of the electric motor shaft 221 and the brushroll 11 is increased, thereby tensioning the drive belt 13. The electric motor 22 may drive the brushroll 11 to rotate through the drive belt 13, thus reaching the objective of starting the actions of dust sweep and dust suction. Certainly, the present disclosure is not limited to this, the user may rotate the machine body 31 from the second vertical position to the second inclined position directly, in this process, the drive belt 13 is tensioned gradually, and then the switch of the upright vacuum cleaner 1 is switched on, thus reaching the objective of triggering the actions of dust sweep and dust suction at the same time.

That is, the user just needs to turn on the switch to start or stop dust sweep by manipulating the direction of the handle of the machine body 31. The operation is simple without need to operate a control panel. Optionally, the switch may be provided to the handle of the machine body 31 to facilitate manual operations, and may also by provided to the brushroll casing 12 or the electric motor housing 21 located below the machine body 31 to make it convenient for the user to switch on the switch by foot. The electric motor 22 may be disposed adjacent to the floor, i.e. the center of gravity of the electric motor 22 is lower than the center of gravity of the electric motor 22 in the vacuum cleaner of the related art, such that with respect to the vacuum cleaner having the machine 31 of the same length, the user may operate the upright vacuum cleaner 1 of the present disclosure more effortlessly and conveniently.

When the upright vacuum cleaner 1 is under the working state, the dirty air, the dust and the like enter the brushroll air suction flow passage 122 from the dust suction inlet of the brushroll casing 12, then enter the the electric motor air suction flow passage 216 in the electric motor housing 21 and is discharged into the machine body assembly 300 through a dirty air output pipe 214 on the electric motor housing 21. The clean air filtered by the machine body assembly 300 enters the electric motor air exhaust flow passage in the electric motor housing 21 through a clean air input pipe 215 of the electric motor housing 21. The air exhaust pipe 39 is disposed between the machine body 31 and the electric motor housing 21, the two ends of the air exhaust pipe 39 are communicated with the machine body air exhaust flow passage 311 of the machine body 31 and the clean air inlet 212 of the electric motor housing 21 respectively. The clean air filtered by the dust cup 37 passes through the machine body air exhaust flow passage 311, the air exhaust pipe 39 and the clean air inlet 212 successively, enters the electric motor air exhaust flow passage in the electric motor housing 21, and is discharged to the external environment through the air exhaust hole 213 of the electric motor housing 21.

It should be noted that, when the machine body 31 is operated from the second vertical position to the second inclined position with the predetermined angle, the electric motor 22 may rotate synchronously with the machine body 31. When the electric motor 22 rotates by the predetermined angle, the machine body 31 may be operated freely by hand without influencing the tensioned state of the drive belt 13. That is, when the electric motor 22 rotates from the first inclined position to the first vertical position, the machine body 31 may be operated freely by hand without influencing the dust sweep and the dust suction of the upright vacuum cleaner 1. Certainly, the present disclosure is not limited to this, and the rotation angle of the machine body 31 may also be directly related to the rotation angle of the electric motor 22. That is, by adjusting the inclined angle of the machine body 31, the adjustment of the position state of the electric motor 22 may be implemented by hand, thereby realizing the objective of adjusting the tension degree of the drive belt 13.

Other configurations and operations of the upright vacuum cleaner 1 according to embodiments of the present disclosure are known to those skilled in the art, which will not be elaborated herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A clutch device for an upright vacuum cleaner, wherein the clutch device is configured to be disposed between an electric motor assembly and a machine body assembly of the upright vacuum cleaner, the electric motor assembly is configured to comprise an electric motor housing and an electric motor disposed in the electric motor housing, and the clutch device comprises:
    a sliding track configured to be driven to move by the machine body assembly;
    a toggling tongue configured to be fixed to the electric motor and rotatable with respect to the electric motor housing; and
    a lever member having a second end of the lever member slidably fitted to the sliding track and a first end fitted with an end of the toggling tongue;
    wherein the machine body assembly is configured to rotate with respect to rotating axis of the toggling tongue between vertical position and inclined position; when the machine body assembly rotates between the vertical position and the inclined position, the machine body assembly drives the sliding track to move, the sliding track drives the lever member to rotate, and the toggling tongue is moved to make the electric motor rotate with respect to the electric motor housing;
    wherein the toggling tongue comprises:
    a rotating portion, one of the rotating portion and the electric motor housing being provided with a rotating shaft, and the other one of the rotating portion and the electric motor housing being provided with a rotating shaft hole configured to be rotatably fitted with the rotating shaft; and
    a tongue portion, having a first end connected to the rotating portion and a second end extending along a curve facing a direction away from the rotating portion, the second end of the tongue portion being fitted with the first end of the lever member.

2. The clutch device according to claim 1, wherein a lower end of the sliding track is provided with a stopping block so as to prevent the end of the lever member from slipping out of the lower end of the sliding track.

3. The clutch device according to claim 1, wherein the sliding track extends along a curve.

4. The clutch device according to claim 3, wherein the sliding track extends along an arc line of which a center axis is configured as a rotation axis of the machine body assembly.

5. The clutch device according to claim 1, wherein the first end of the lever member is configured as a hook, and the end of the toggling tongue is engaged in the hook.

6. The clutch device according to claim 1, wherein the toggling tongue is integrally formed with the electric motor casing of the electric motor.

7. The clutch device according to claim 1, wherein the lever member is rotatably connected to a side wall of the electric motor housing.

8. The clutch device according to claim 7, wherein two lever members are provided and symmetrically disposed to two sides of the electric motor housing.

9. An upright vacuum cleaner comprising:
    a brushroll and an electric motor assembly, wherein the electric motor assembly comprises an electric motor housing and an electric motor disposed in the electric motor housing, and the electric motor drives the brushroll to roll by the drive belt and is rotatable between a first vertical position of tensioning the drive belt and a first inclined position of relaxing the drive belt;
    a machine body assembly comprising a machine body and a bridging member mounted to the machine body, wherein the bridging member is rotatably connected to the electric motor housing so that the machine body is rotatable between a second vertical position and a second inclined position; and
    a clutch device, wherein the clutch device is disposed between the bridging member and the electric motor, and when the machine body is moved from the second vertical position to the second inclined position, the bridging member drives the electric motor to move from the first inclined position to the first vertical position by the clutch device;

wherein the clutch device is configured to be disposed between the electric motor assembly and the machine body assembly of the upright vacuum cleaner, and the clutch device comprises:
a sliding track configured to be driven to move by the machine body assembly;
a toggling tongue configured to be fixed to the electric motor and rotatable with respect to the electric motor housing; and
a lever member having a second end of the lever member slidably fitted to the sliding track and a first end fitted with an end of the toggling tongue;
wherein the machine body assembly is configured to rotate with respect to rotating axis of the toggling tongue between vertical position and inclined position; when the machine body assembly rotates between the vertical position and the inclined position, the machine body assembly drives the sliding track to move, the sliding track drives the lever member to rotate, and the toggling tongue is moved to make the electric motor rotate with respect to the electric motor housing;
wherein the toggling tongue comprises:
a rotating portion, one of the rotating portion and the electric motor housing being provided with a rotating shaft, and the other one of the rotating portion and the electric motor housing being provided with a rotating shaft hole configured to be rotatably fitted with the rotating shaft; and
a tongue portion, having a first end connected to the rotating portion and a second end extending along a curve facing a direction away from the rotating portion, the second end of the tongue portion being fitted with the first end of the lever member;
wherein the brushroll comprises a first brushroll segment provided with bristle, a second brushroll segment provided with bristle and a connecting shaft segment connected between the first brushroll segment and the second brushroll segment, and the drive belt is twined around the electric motor shaft and the connecting shaft segment so that the electric motor drives the brushroll to rotate;

wherein the upright vacuum cleaner further comprising a brushroll casing covering the brushroll, wherein the brushroll casing is internally provided with a drive belt mounting cavity for accommodating the connecting shaft segment and the drive belt, a first air suction flow passage and a second air suction flow passage are located at two sides of the mounting cavity and spaced apart from the mounting cavity, both air suction flow passages are not air-communicative with the drive belt mounting cavity.

10. The upright vacuum cleaner according to claim 9, wherein an angle by which the electric motor is rotated from the first inclined position to the first vertical position ranges from 1° to 10°.

11. The upright vacuum cleaner according to claim 10, wherein an angle by which the electric motor is rotated from the first inclined position to the first vertical position ranges from 3° to 8°.

12. The upright vacuum cleaner according to claim 9, further comprising a tensioning pulley or an elastic element for adjusting a tension degree of the drive belt.

13. The upright vacuum cleaner according to claim 9, wherein the bridging member and the machine body are separately formed and connected by assembling, or the bridging member and the machine body are integrally formed.

14. The upright vacuum cleaner according to claim 9, wherein an electric motor shaft of the electric motor is vertically disposed, a rotation axis of the brushroll is disposed perpendicularly to the electric motor shaft, and the drive belt is provided with a twist angle of 90° and is twined around the electric motor shaft and the brushroll so that the electric motor drives the brushroll to rotate.

15. The upright vacuum cleaner according to claim 9, wherein respective center axes of the first brushroll segment, the second brushroll segment and the connecting shaft segment are in the same line, and the first brushroll segment and the second brushroll segment are symmetrical relative to the drive belt.

* * * * *